US009260192B2

(12) United States Patent
Lu et al.

(10) Patent No.: US 9,260,192 B2
(45) Date of Patent: Feb. 16, 2016

(54) ACTIVE VENT AND RE-INFLATION SYSTEM FOR A CRASH ATTENTUATION AIRBAG

(71) Applicant: BELL HELICOPTER TEXTRON INC., Fort Worth, TX (US)

(72) Inventors: Zi Lu, Coppell, TX (US); Cheng-Ho Tho, Irving, TX (US); Michael R. Smith, Colleyville, TX (US); Michael Seifert, Southlake, TX (US)

(73) Assignee: Textron Innovations Inc., Providence, RI (US)

(*) Notice: Subject to any disclaimer, the term of this patent is extended or adjusted under 35 U.S.C. 154(b) by 0 days.

(21) Appl. No.: 14/525,947

(22) Filed: Oct. 28, 2014

(65) Prior Publication Data

US 2015/0041584 A1    Feb. 12, 2015

Related U.S. Application Data

(63) Continuation-in-part of application No. 13/641,426, filed as application No. PCT/US2010/062300 on Dec. 29, 2010, now Pat. No. 8,870,115, and a continuation-in-part of application No. 13/380,925, (Continued)

(51) Int. Cl.
*B64C 25/56* (2006.01)
*B64D 25/00* (2006.01)

(52) U.S. Cl.
CPC ............ *B64D 25/00* (2013.01); *B64D 2201/00* (2013.01)

(58) Field of Classification Search
None
See application file for complete search history.

(56) References Cited

U.S. PATENT DOCUMENTS

| 1,257,413 | A | | 2/1918 | Sloper |
| 2,131,528 | A | * | 9/1938 | Soyer ............................ 244/107 |
| 2,713,466 | A | * | 7/1955 | Fletcher et al. ........... 244/138 R |
| 3,154,270 | A | | 8/1962 | Jensen |

(Continued)

FOREIGN PATENT DOCUMENTS

| DE | 3024551 A1 | 1/1982 |
| DE | 4118300 | 12/1992 |

(Continued)

OTHER PUBLICATIONS

REAPS Rotorcraft Protection, Brochure by RAFAEL Armament Development Authority, Ltd., Ordnance Systems Division, Haifa, Israel.

(Continued)

*Primary Examiner* — Medhat Badawi
(74) *Attorney, Agent, or Firm* — James E. Walton

(57) ABSTRACT

A crash attenuation system has an airbag inflatable generally adjacent to an exterior of the aircraft. The system includes a gas generator in fluid communication with an interior of the airbag. The system also includes a vent system having a vent passage supported by the aircraft, the vent passage being configured to allow gas to escape from within the airbag during an impact to a second set of airbags for flotation. The vent system also includes an actuator door for sealing the vent passage, thereby preventing gas from leaving the airbag. The actuator door is actuated by an actuator, the actuator being in fluid communication with the gas generator through an actuator duct. The system operates such that deployment of gas from the gas generator causes the actuator to inflate, thereby causing the actuator door to seal the vent passage. The gas generator is configured to re-inflate the airbag after the actuator door seals the vent passage.

17 Claims, 10 Drawing Sheets

Related U.S. Application Data filed as application No. PCT/US2009/051815 on Jul. 27, 2009, now Pat. No. 8,588,996, said application No. 13/641,426 is a continuation-in-part of application No. 13/125,884, filed as application No. PCT/US2009/051821 on Jul. 27, 2009, now Pat. No. 8,474,753.

(56) References Cited

U.S. PATENT DOCUMENTS

| | | | |
|---|---|---|---|
| 3,129,909 A | 11/1962 | Smith | |
| 3,117,752 A | 1/1964 | Gillmore | |
| 3,602,661 A | 8/1971 | Liedberg | |
| 3,603,535 A * | 9/1971 | DePolo | 244/121 |
| 3,727,716 A * | 4/1973 | Jenkins | 180/124 |
| 3,738,597 A * | 6/1973 | Earl et al. | 244/100 A |
| 3,961,806 A * | 6/1976 | Katter | 280/732 |
| 3,964,698 A * | 6/1976 | Earl | 244/100 A |
| 3,981,462 A * | 9/1976 | Berezhnoi et al. | 244/100 A |
| 3,990,658 A * | 11/1976 | Letsinger | 244/100 A |
| 4,004,761 A * | 1/1977 | McAvoy | 244/100 A |
| 4,032,088 A | 6/1977 | McAvoy | |
| 4,068,606 A * | 1/1978 | Van Veldhuizen | 114/67 A |
| 4,165,059 A | 8/1979 | Summer | |
| 4,205,811 A | 6/1980 | Palm | |
| 4,645,142 A | 2/1987 | Soelter | |
| 4,655,415 A | 4/1987 | Miller | |
| 4,657,516 A | 4/1987 | Tassy | |
| 4,697,762 A | 10/1987 | Arney | |
| 4,923,145 A | 5/1990 | Broadhurst | |
| 5,259,574 A * | 11/1993 | Carrot | 244/100 A |
| 5,356,097 A | 10/1994 | Chalupa | |
| 5,407,150 A | 4/1995 | Sadleir | |
| 5,560,568 A | 10/1996 | Schmittle | |
| 5,630,619 A * | 5/1997 | Buchanan et al. | 280/741 |
| 5,725,244 A | 3/1998 | Cundill | |
| 5,765,778 A | 6/1998 | Otsuka | |
| 5,836,544 A | 11/1998 | Gentile | |
| 5,928,300 A | 7/1999 | Rogers | |
| 5,992,794 A | 11/1999 | Rotman | |
| 5,992,881 A * | 11/1999 | Faigle | 280/737 |
| 6,042,051 A | 3/2000 | Hagerty | |
| 6,062,599 A | 5/2000 | Forbes | |
| 6,070,546 A | 6/2000 | Downey | |
| 6,158,691 A | 12/2000 | Menne | |
| 6,227,325 B1 | 5/2001 | Shah | |
| 6,273,463 B1 | 8/2001 | Peterson | |
| 6,338,456 B1 | 1/2002 | Cairo-Iocco | |
| 6,439,256 B2 | 8/2002 | Koelsch | |
| 6,497,389 B1 | 12/2002 | Rawdon | |
| 6,497,429 B2 | 12/2002 | Matsumoto | |
| 6,565,431 B1 | 5/2003 | Villela | |
| 6,648,371 B2 | 11/2003 | Vendely | |
| 6,682,017 B1 * | 1/2004 | Giannakopoulos | 244/140 |
| 6,749,218 B2 | 6/2004 | Breed | |
| 6,820,898 B2 | 11/2004 | Dinsdale | |
| 6,886,776 B2 | 5/2005 | Wagner | |
| 7,104,566 B2 | 9/2006 | Pinsenschaum | |
| 7,232,001 B2 | 6/2007 | Hakki | |
| 7,445,232 B2 * | 11/2008 | Takimoto | 280/729 |
| 7,549,674 B2 | 6/2009 | Yoshikawa | |
| 7,690,681 B2 | 4/2010 | Hall | |
| 7,775,554 B2 | 8/2010 | Smydra | |
| 7,784,822 B2 * | 8/2010 | Fink | 280/730.2 |
| 7,828,326 B2 | 11/2010 | Arez | |
| 7,954,752 B2 | 6/2011 | Smith | |
| 8,095,276 B2 | 1/2012 | Kozyreff | |
| 8,348,192 B2 | 1/2013 | Tho | |
| 8,418,957 B2 * | 4/2013 | Smith et al. | 244/100 A |
| 8,474,753 B2 * | 7/2013 | Hill et al. | 244/100 A |
| 8,870,115 B2 | 10/2014 | Lu | |
| 2001/0019089 A1 | 9/2001 | Happ | |
| 2002/0027353 A1 | 3/2002 | Keshavaraj | |
| 2003/0062443 A1 | 4/2003 | Wagner | |
| 2003/0149530 A1 | 8/2003 | Stopczynski | |
| 2003/0192730 A1 | 10/2003 | Kikuchi | |
| 2004/0107033 A1 | 6/2004 | Rao | |
| 2005/0077426 A1 | 4/2005 | Simard | |
| 2005/0098995 A1 | 5/2005 | Fischer | |
| 2005/0269452 A1 | 12/2005 | Wakefield | |
| 2006/0091653 A1 | 5/2006 | De Mersseman | |
| 2006/0232052 A1 | 10/2006 | Breed | |
| 2006/0274149 A1 | 12/2006 | Yoshizawa | |
| 2007/0246922 A1 | 10/2007 | Manssart | |
| 2008/0017754 A1 | 1/2008 | Taylor et al. | |
| 2008/0087511 A1 | 4/2008 | Taylor | |
| 2008/0154495 A1 | 6/2008 | Breed | |
| 2010/0044507 A1 | 2/2010 | Smith | |
| 2010/0094508 A1 | 4/2010 | Kozyreff | |
| 2010/0206983 A1 | 8/2010 | Tho | |
| 2011/0204181 A1 | 8/2011 | Hill | |
| 2011/0226898 A1 | 9/2011 | Smith | |
| 2012/0209505 A1 | 8/2012 | Breed | |
| 2013/0032665 A1 | 2/2013 | Lu | |
| 2013/0068883 A1 | 3/2013 | Lu | |
| 2015/0041584 A1 * | 2/2015 | Lu et al. | 244/100 A |

FOREIGN PATENT DOCUMENTS

| | | |
|---|---|---|
| DE | 4320470 A1 | 6/1993 |
| EP | 0423981 A1 | 4/1991 |
| EP | 0869058 A2 | 10/1998 |
| EP | 1403180 | 3/2003 |
| EP | 1575810 A1 | 9/2005 |
| JP | 5322496 | 12/1993 |
| JP | 8192797 | 7/1996 |
| JP | 11268605 | 10/1999 |
| JP | 11268605 A | 10/1999 |
| JP | 5322496 B2 | 10/2013 |
| WO | 03080392 | 10/2003 |
| WO | 2006046038 | 5/2006 |
| WO | 2006046039 A2 | 5/2006 |
| WO | 2008054401 A2 | 5/2008 |
| WO | 2009001342 A2 | 12/2008 |
| WO | 2009054844 A1 | 4/2009 |
| WO | 2011014153 A1 | 2/2011 |
| WO | 2012115633 A1 | 8/2012 |

OTHER PUBLICATIONS

Kevin Coyne, F-111 Crew Module Escape and Survival Systems, pp. 1-10, http://www.f-111.net/ejection.htm.

"CABS Cockpit Air Bag System," Armor Holdings Aerospace & Defense Group, Jan. 2006.

Akif Bolukbasi, "Active Crash Protection Systems for UAVs," American Helicopter Society Annual Forum 63 Proceedings, Virginia Beach, VA May 1-3, 2007.

Akif Bolukbasi, "Active Crash Protection Systems for Rotorcraft," Center for Rotorcraft Innovation/National Rotorcraft Technology Center Program 2007 Year End Review, Pheonix, AZ, Feb. 19-20, 2008.

Non-final Office Action dated Aug. 6, 2010 from related U.S. Appl. No. 12/089,884.

Amendment dated Sep. 20, 2010 from related U.S. Appl. No. 12/089,884.

Final Office Action dated Dec. 8, 2010 from related U.S. Appl. No. 12/089,884.

Amendment After Final Office Action dated Jan. 5, 2011 from related U.S. Appl. No. 12/089,884.

Notice of Allowance dated Jan. 26, 2011 from related U.S. Appl. No. 12/089,884.

Office Action dated Dec. 23, 2009 from counterpart CA App. No. 2,628,380.

Office Action dated Feb. 8, 2011 from counterpart CA App. No. 2,628,380.

Extended European Search Report dated Aug. 6, 2012 from counterpart EP App. No. 06851913.1.

Notice of Allowance dated Dec. 12, 2012 from related U.S. Appl. No. 13/110,607.

First Office Action dated Dec. 23, 2013 from counterpart CN App. No. 200980160661.8.

(56) References Cited

OTHER PUBLICATIONS

Second Office Action dated Aug. 6, 2014 from counterpart CN App. No. 200980160661.8.
Third Office Action dated Feb. 25, 2015 from counterpart CN App. No. 200980160661.8.
International Search Report and Written Opinion dated Sep. 11, 2009 from counterpart PCT App. No. PCT/US2009/051821.
Extended European Search Report dated Feb. 4, 2013 from counterpart EP App. No. 9847899.3.
Office Action dated Oct. 21, 2013 from counterpart EP App. No. 9847899.3.
International Search Report and Written Opinion dated Jun. 13, 2011 from Counterpart PCT App. No. PCT/US2011/030514.
International Preliminary Report on Patentability dated Oct. 1, 2013 from Counterpart PCT App, No. PCT/US2011/030514.
Non-final Office Action dated Jul. 17, 2014 from related U.S. Appl. No. 13/699,758.
Amendment dated Oct. 17, 2014 from related U.S. Appl. No. 13/699,758.
Notice of Allowance dated Jan. 27, 2015 from related U.S. Appl. No. 13/699,758.
Extended European Search Report dated Feb. 3, 2014 from counterpart EP App. No. 10861426.4.
Extended European Search Report dated Jul. 10, 2014 from counterpart EP App. No. 11862579.7.
Examination Report dated 36 Mar. 2015 from counterpart EP App. No. 11862579.7.
Office Action dated Sep. 8, 2014 from counterpart CA App. No. 2,828,084.
First Office Action dated Apr. 29, 2011 from Counterpart CN App. No. 200680041870.7.
Notice to Grant dated Jan. 21, 2012 from Counterpart CN App. No. 200680041870.7.
Extended European Search Report dated Apr. 2, 2013 from counterpart EP App. No. 09847898.5.
Office Action dated Oct. 23, 2013 from counterpart EP App. No. 09847898.5.
Office Action dated Oct. 30, 2013 from counterpart CA App. No. 2,767,797.
Notice of Allowance dated Jun. 24, 2014 from related U.S. Appl. No. 13/641,426.
Preliminary Amendment dated Nov. 8, 2012 from related U.S. Appl. No. 13/696,970.
Non-final Office Action dated Nov. 3, 2014 from U.S. Appl. No. 13/696,970.
Amendment dated Feb. 3, 2015from related U.S. Appl. No. 13/696,970.
Final Office Action dated Feb. 25, 2015 from related U.S. Appl. No. 13/696,970.
Office Action dated Jul. 2, 2013 from counterpart CA App. No. 2,767,796.
International Search Report and Written Opinion dated Sep. 11, 2009 from counterpart PCT App. No. PCT/US2009/051815.
Article 34 Amendment dated May 19, 2011 from counterpart PCT App. No. PCT/US2009/051815.
International Preliminary Report on Patentability dated Sep. 28, 2011 from counterpart PCT App. No. PCT/US2009/051815.
International Search Report and Written Opinion dated Apr. 18, 2008 from counterpart PCT App. No. PCT/US2007/082140.
Article 34 Amendment dated Aug. 18, 2008 from counterpart PCT App. No. PCT/US2007/082140.
Article 34 Amendment dated Oct. 13, 2000 from counterpart PCT App. No. PCT/US2007/082140.
International Preliminary Report on Patentability dated Mar. 15, 2010 from counterpart PCT App. No. PCT/US2007/082140.
International Search Report and Written Opinion dated Feb. 28, 2011 from counterpart PCT App. No. PCT/US2010/062300.
International Preliminary Report on Patentability dated Jul. 11, 2013 from counterpart PCT App. No. PCT/US2010/062300.
International Search Report and Written Opinion dated Apr. 25, 2011 from counterpart PCT App. No. PCT/US2011/025857.
International Preliminary Report on Patentability dated Aug. 27, 2013 from counterpart PCT App. No. PCT/US2011/025857.
Notice of Allowance dated Mar. 25, 2013 from related U.S. Appl. No. 13/125,884.
Office Action dated Oct. 2, 2014 from counterpart CA App. No. 2,830,894.
Examination Report dated Mar. 22, 2011 from counterpart MX App. No. MX/a/2008/006008 PCT.
Third Office Action dated Feb. 25, 2015 from related CN App. No. 200980160661.8.
Extended European Search Report dated Feb. 11, 2014 from counterpart EP App. No. 11859409.2.
Examination Report dated Aug. 6, 2014 from counterpart EP App. No. 11859409.2.
Office Action dated Jul. 25, 2014 from counterpart CA App. No. 2,821,326.
Office Action dated Apr. 24, 2015 from counterpart IN App. No. 1881/KOLNP/2008.
Notice of Allowance dated Sep. 7, 2012 from related U.S. Appl. No. 12/679,563.
Extended European Search Report dated Aug. 6, 2012 from counterpart EP App. No. 07844510.3.
Office Action dated Jun. 21, 2013 from counterpart EP App. No. 07844510.3.
International Search Report and Written Opinion dated Jul. 18, 2008 from related application PCT/US2006/043706.
International Preliminary Report on Patentability dated Mar. 19, 2009 from related application PCT/US2006/043706.
Translation of First Office Action dated Feb. 23, 2011 from counterpart CN App. No. 2008-542336.
Notice of Allowance dated Jul. 12, 2013 from related U.S. Appl. No. 13/380,925.
First Office Action dated Apr. 27, 2012 from counterpart CN App. No. 200780101221.6.
Second Office Action dated Jun. 9, 2013 from counterpart CN App. No. 200780101221.6.
First Office Action dated Dec. 20, 2013 from counterpart CN App. No. 200980160564.9.
Second Office Action dated Jun. 24, 2014 from counterpart CN App. No. 200980160564.9.

\* cited by examiner

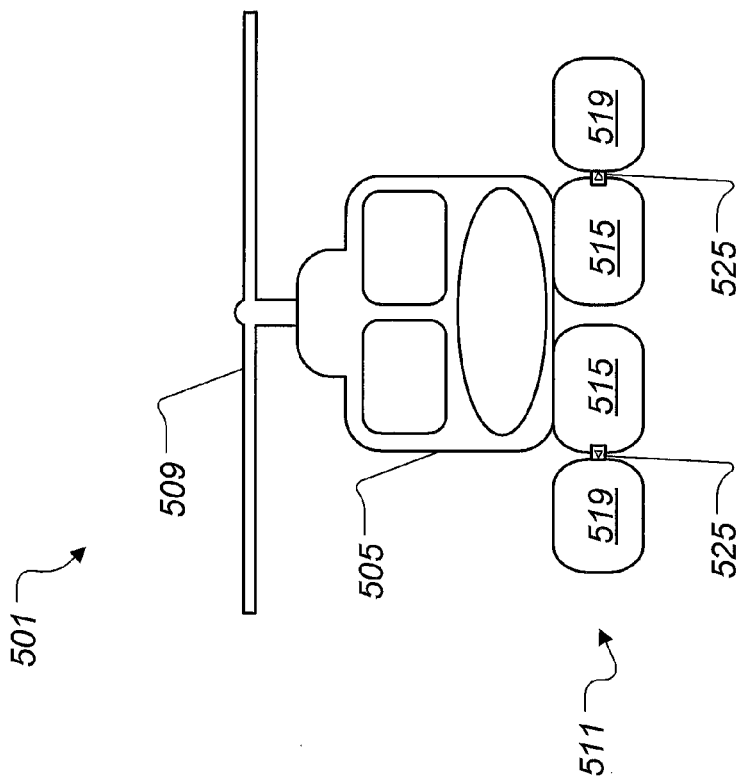
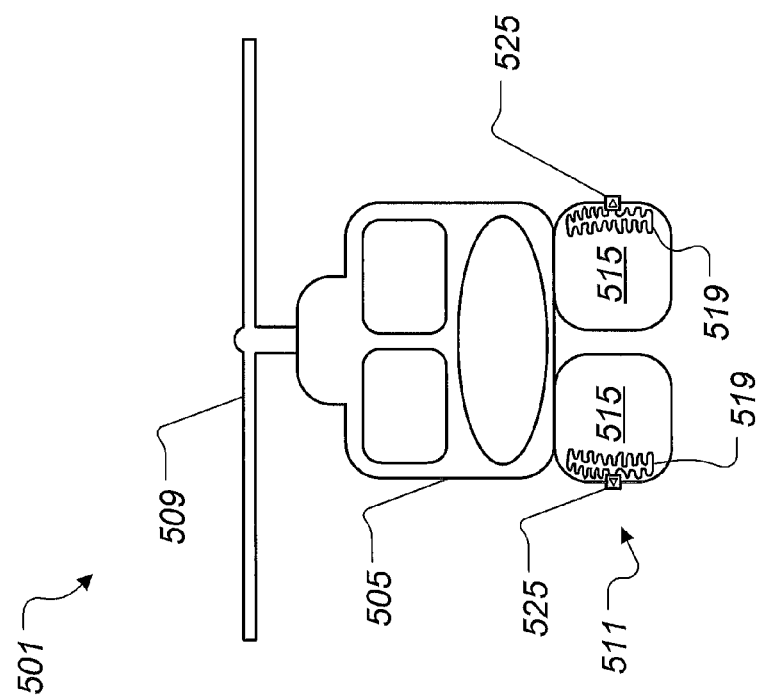

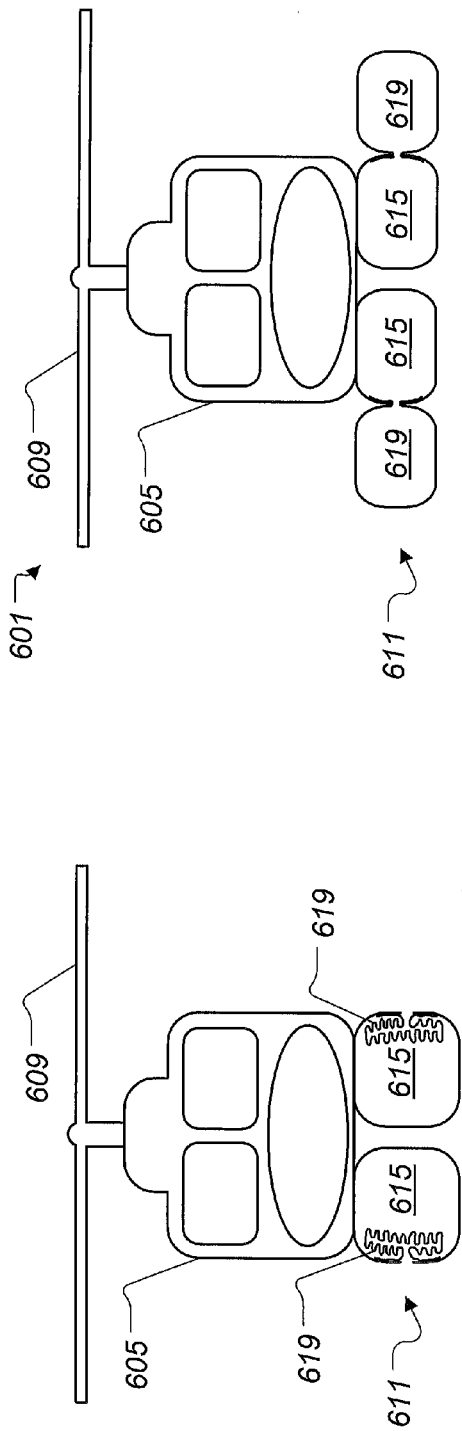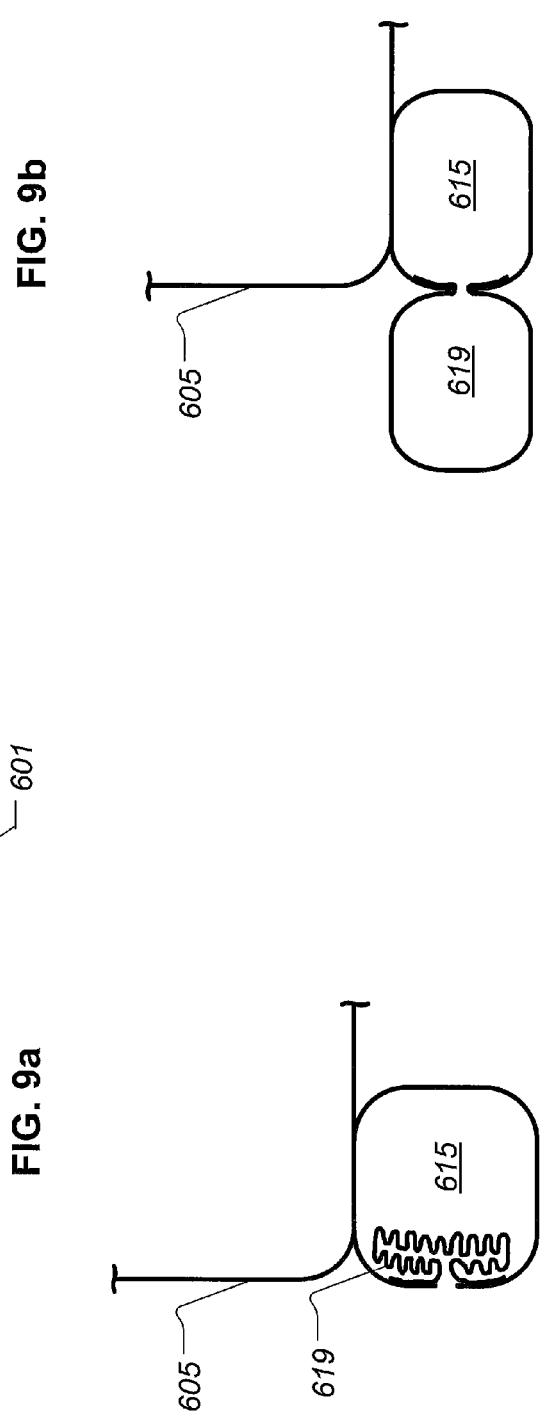
FIG. 9a
FIG. 9b
FIG. 9c
FIG. 9d

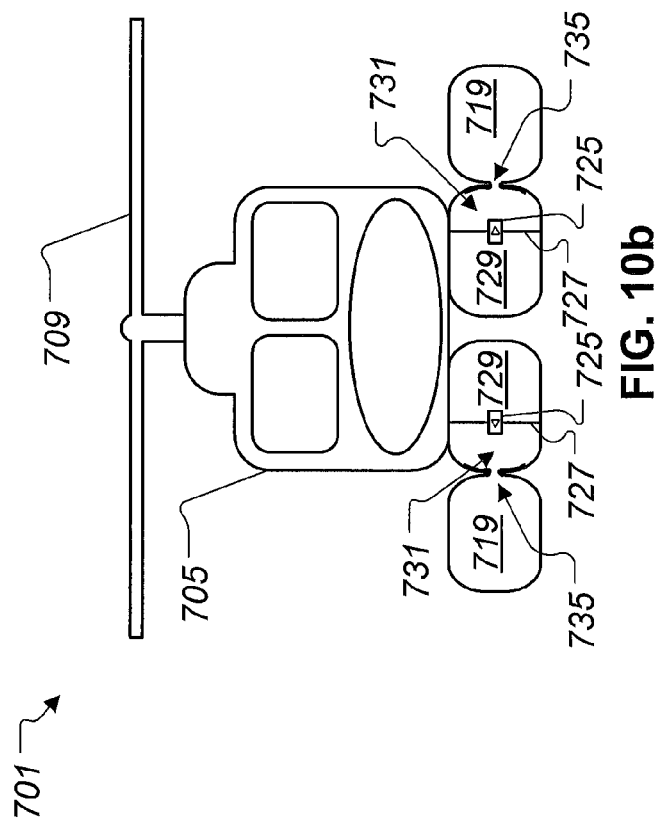
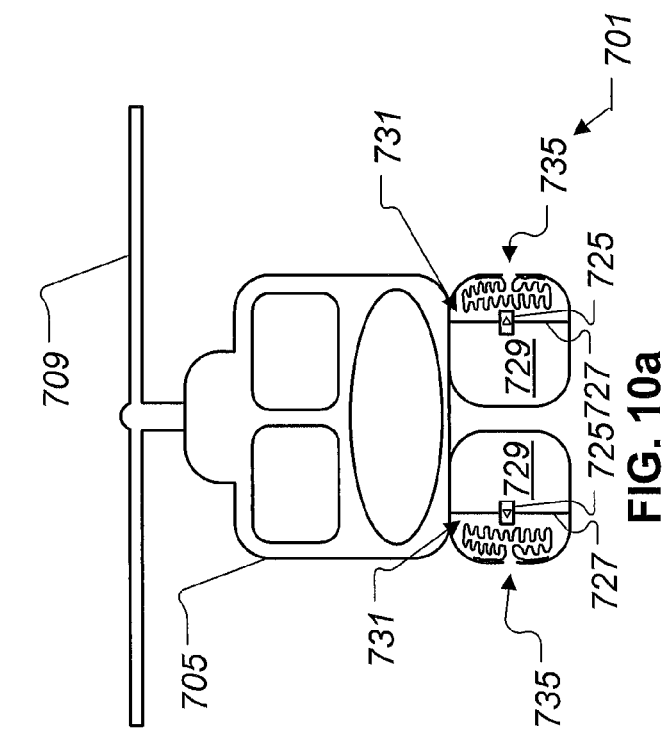

ACTIVE VENT AND RE-INFLATION SYSTEM FOR A CRASH ATTENUATION AIRBAG

CROSS REFERENCE TO RELATED APPLICATIONS

This application is a continuation in part of U.S. application Ser. No. 13/641,426, filed 15 Oct. 2012, titled "Active Vent and Re-Inflation System for a Crash Attenuation Airbag," which is a 371 of international PCT application No. PCT/US10/062300, filed 29 Dec. 2010, titled "Active Vent and Re-Inflation System for a Crash Attenuation Airbag," which is a continuation in part of U.S. application Ser. No. 13/380,925, filed 27 Dec. 2011, titled "Aircraft Occupant Protection System," which is a 371 of international PCT application No. PCT/US09/051815, filed 27 Jul. 2009, titled "Aircraft Occupant Protection System,"; and a continuation in part of U.S. application Ser. No. 13/125,884, filed 25 Apr. 2011, titled "Aircraft Occupant Protection System," which is a 371 of international PCT application No. PCT/US09/051821, filed 27 Jul. 2009, titled "Aircraft Occupant Protection System," all of which are hereby incorporated by reference for all purposes as if fully set forth herein.

BACKGROUND

1. Field of the Invention

The system of the present application relates to airbags for a vehicle. In particular, the system of the present application relates to a vent system for use with external airbags for an aircraft.

2. Description of Related Art

Conventional airbag systems typically don't have a means for resealing after venting during a crash. As such, the airbag vents through a blow-away valve, or the like. Other conventional airbag systems may rely upon a designated actuator system for controlling airflow and/or sealing an airbag vent passage. A designated actuator system adds complexity and weight to the aircraft.

Although the developments in airbag systems have produced significant improvements, considerable shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 8a is a perspective view of a re-inflation for flotation system before an impact, according to the present application;

FIG. 8b is a perspective view of a re-inflation for flotation system after an impact, according to the present application;

FIG. 9a is a perspective view of a re-inflation for flotation system before an impact, according to the present application;

FIG. 9b is a perspective view of a re-inflation for flotation system after an impact, according to the present application;

FIG. 9c is a enlarged view of the re-inflation for flotation system shown in FIG. 9a;

FIG. 9d is a enlarged view of the re-inflation for flotation system shown in FIG. 9b;

FIG. 10a is a perspective view of a re-inflation for flotation system before an impact, according to the present application; and FIG. 10b is a perspective view of a re-inflation for flotation system after an impact, according to the present application.

Figure 1:
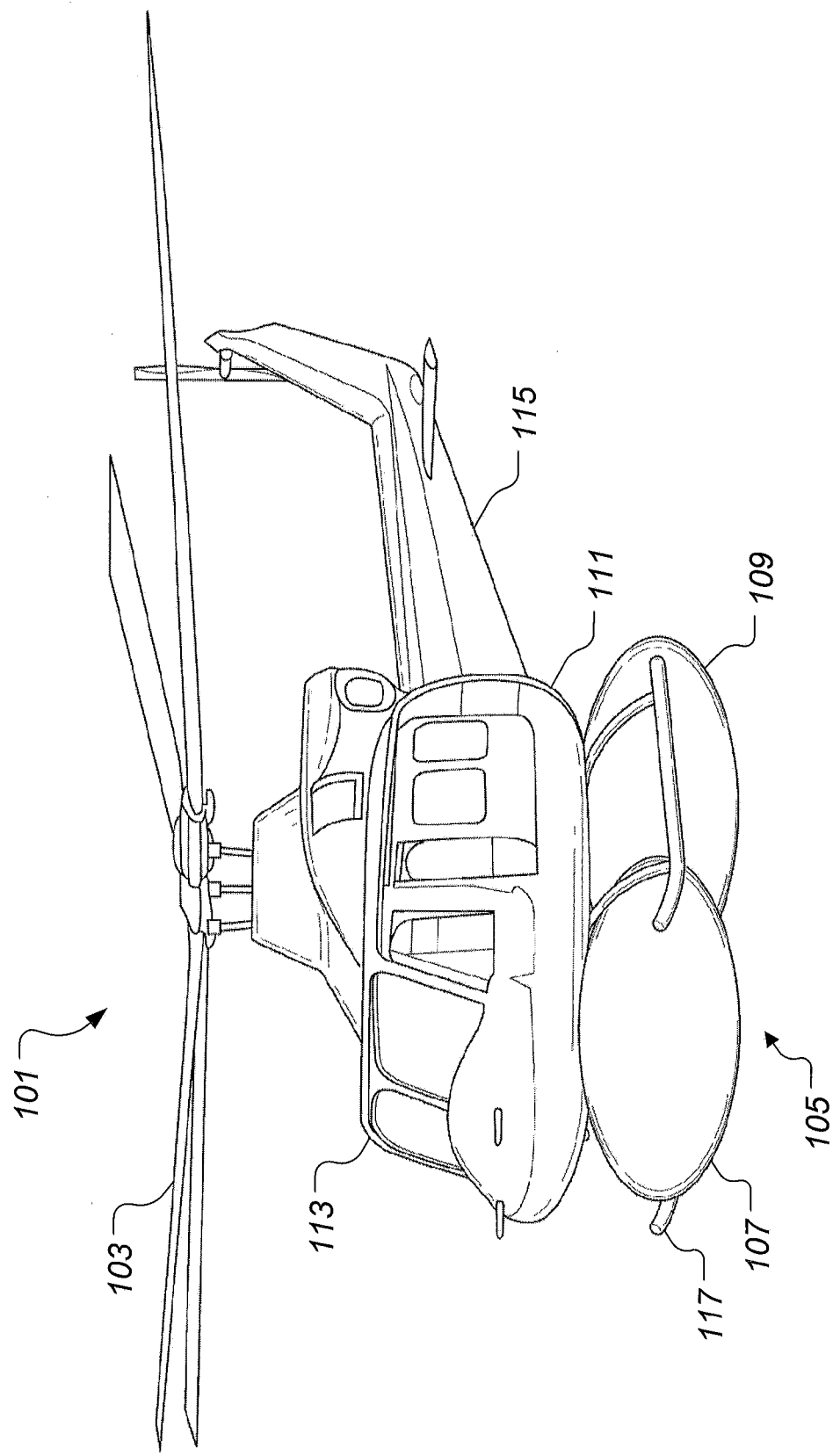
FIG. 1 is a perspective view of a rotorcraft equipped with an external airbag system.

While the system and method of the present application are susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The inflatable crash attenuation system of the present application includes one or more airbags that are inflated prior to impact so as to reduce occupant injury and aircraft structure damage and vented during impact so as to prevent an undesired secondary impact. The system is configured to be selectively re-inflated after venting. The system can be used on a number of different types of aircraft, for example, helicopter, fixed wing aircraft, and other aircraft, and in particular those that are rotorcraft.

FIG. 1 shows a rotorcraft 101 incorporating the crash attenuation system according to the present disclosure. Rotorcraft 101 comprises a fuselage 111 and a tail boom 115. A rotor system 103 provides lift and propulsive forces for flight of rotorcraft 101. A pilot sits in a cockpit 113 in a forward portion of fuselage 111. A landing gear 117 extends from a lower portion of fuselage 111 for supporting rotorcraft 101 on a rigid surface, such as the ground. It should be appreciated that even though landing gear is depicted as skid gear, the systems of the present application may be implemented on a rotorcraft having other types of landing gear, such as a retractable landing gear, as an example.

A malfunction with rotor system 103, the drive system, or any other flight critical component, may necessitate a descent from altitude at a higher rate of speed than is desirable. If the rate is an excessively high value at impact with the ground or water, the occupants of rotorcraft 101 may be injured. Further, such an impact may cause rotorcraft 101 to be severely damaged by the decelerative forces exerted on rotorcraft 101. To reduce these forces, an external airbag system comprising inflatable, non-porous airbags 107 and 109 is installed under fuselage 111. Though not shown in the drawings, airbags 107 and 109 are stored in an un-inflated condition and are inflated under the control of a crash attenuation control system.

It should be appreciated that the quantity and geometry of airbags 107 and 109 may take on a variety of configurations. Each airbag, such as airbag 107, preferably has a relatively non-porous bladder. In a preferred embodiment, the bladder is formed of a fabric that comprises resilient material such as Kevlar and/or Vectran. A vent may communicate with the interior of the bladder, allowing for gas to controllably escape from within the airbag 107.

Figure 2:
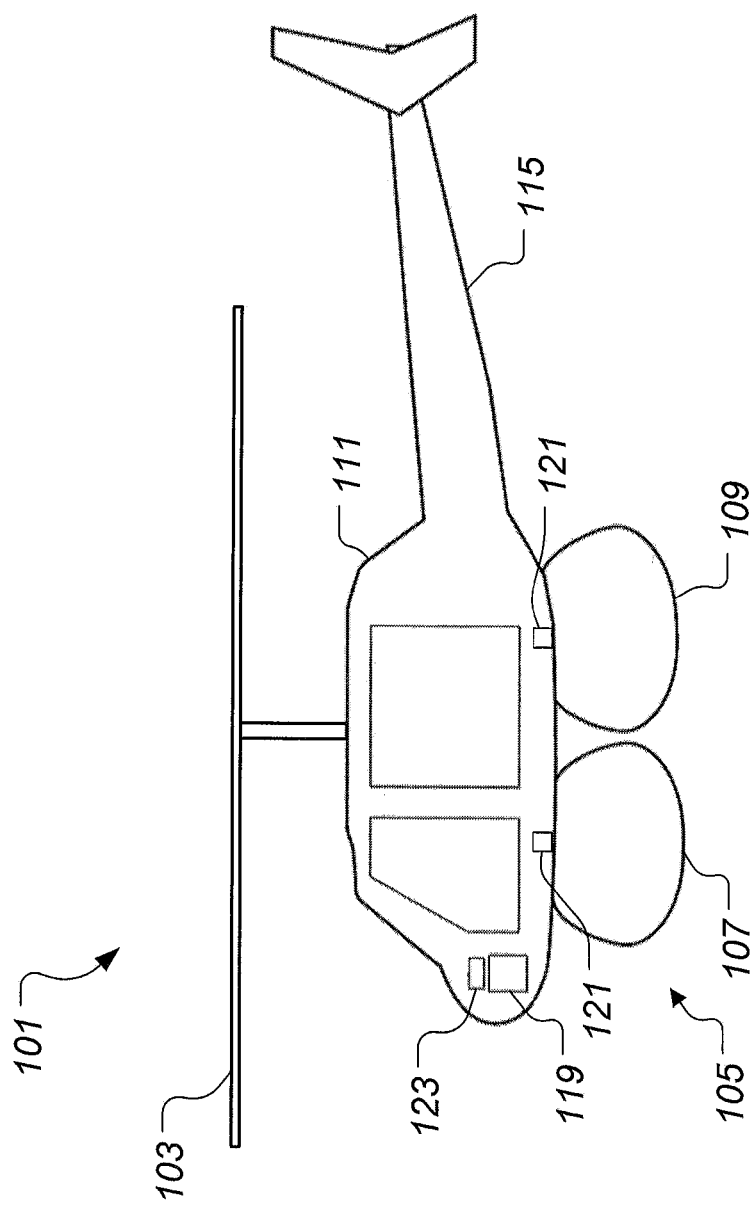
FIG. 2 is stylized block diagram of the rotorcraft shown in FIG. 1.

FIG. 2 shows airbags 107 and 109 mounted to a lower portion of fuselage 111 and shows additional components of the crash attenuation system according to the present disclosure. A computer-based control system 119, which is shown mounted within fuselage 111, is provided for controlling the operation of components associated with airbags 107 and 109. Each airbag 107 and 109 has a gas controller 121 for controlling one or more gas generators 305a-305e (shown in FIGS. 4-6) for inflation of the airbags 107 and 109. In addition, the crash attenuation system has a sensor system 123 for detecting crash conditions used to control external airbag system 105, such as rate of descent and/or ground proximity. External airbag system 105 may also have a water-detection system (not shown), which may have sensors mounted on fuselage 111 for detecting a crash in water. Gas controller 121, components for airbags 107 and 109, and sensor system 123 are in communication with control system 119, allowing control system 119 to communicate with, monitor, and control the operation of these attached components. In addition, control system 119 may be in communication with a flight computer or other system for allowing the pilot to control operation of the crash attenuation system. For example, the pilot may be provided means to override, disarm, or arm the crash attenuation system.

The sensor system 123 is shown in FIG. 2 as a discrete component for the sake of convenience. However, it should be noted that actual implementations of the sensor system 123 can comprise a number of components that are located at various locations on the rotorcraft 101. The sensor system 123 may include, for example, sensors for detecting pitch and roll attitude, pitch and roll rate, airspeed, altitude, rate of descent, fluid at impact surface, and slope of the impact surface.

Figure 3:
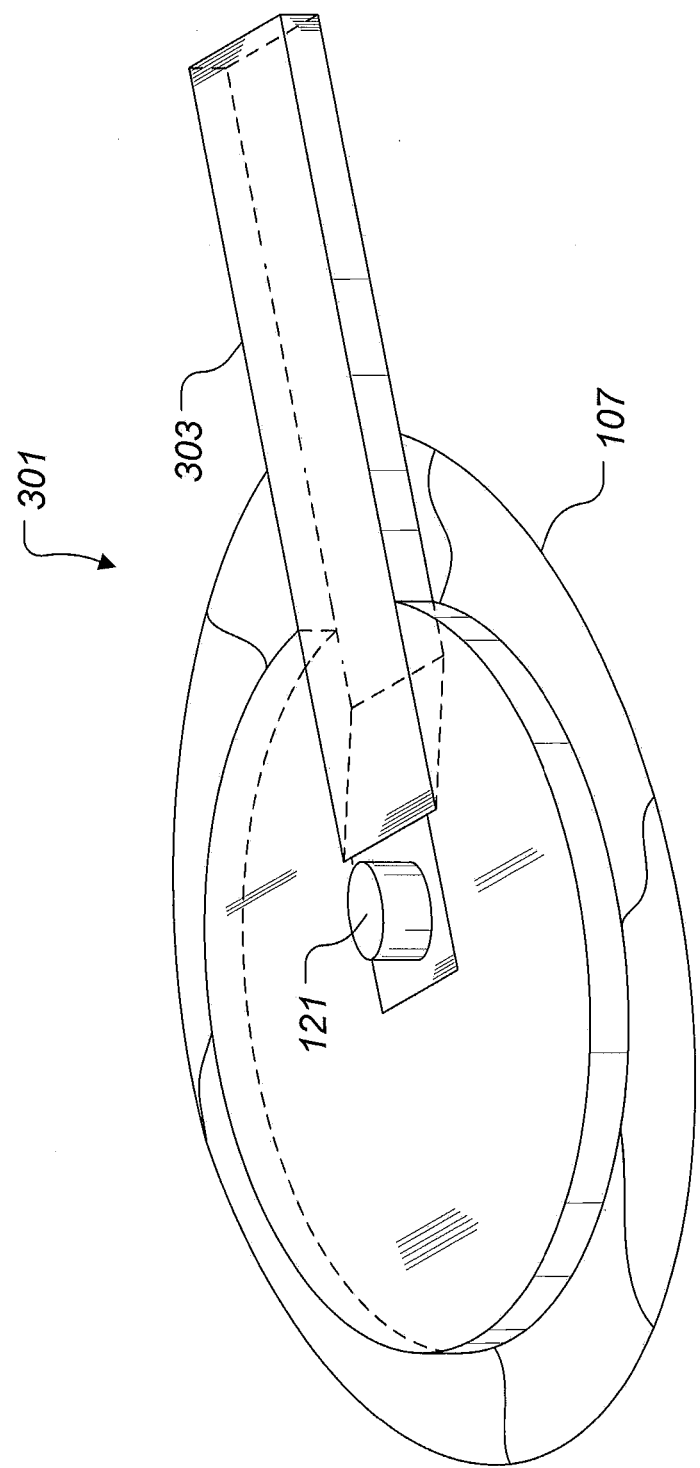
FIG. 3 is a partial perspective view of a vent and re-inflation system, according to the preferred embodiment of the present application.

FIG. 3 shows a partial top view of a vent and re-inflation system 301. System 301 includes a vent passage 303 configured to selectively vent air from airbag 107. Vent passage 303 is formed by rigid substrates, such as sheet metal, composite structure, or another rigid material. Vent passage 303 is preferably long enough to extend beyond the upper portion of airbag 107 in order to prevent airbag 107 from inadvertently acting as a seal against second opening 309. Gas controller 121 selectively controls the operation of gas generators 305a-305e (shown in FIGS. 4-6), which are in fluid communication with an interior of airbag 107. It should be appreciated that vent and re-inflation system 301 is discussed herein with regards to airbag 107 to the sake of clarity. However, vent and re-inflation system 301 is also included as part of airbag 109. Furthermore, vent and re-inflation system 301 may be included in a wide variety of airbag system configurations.

Figure 4:
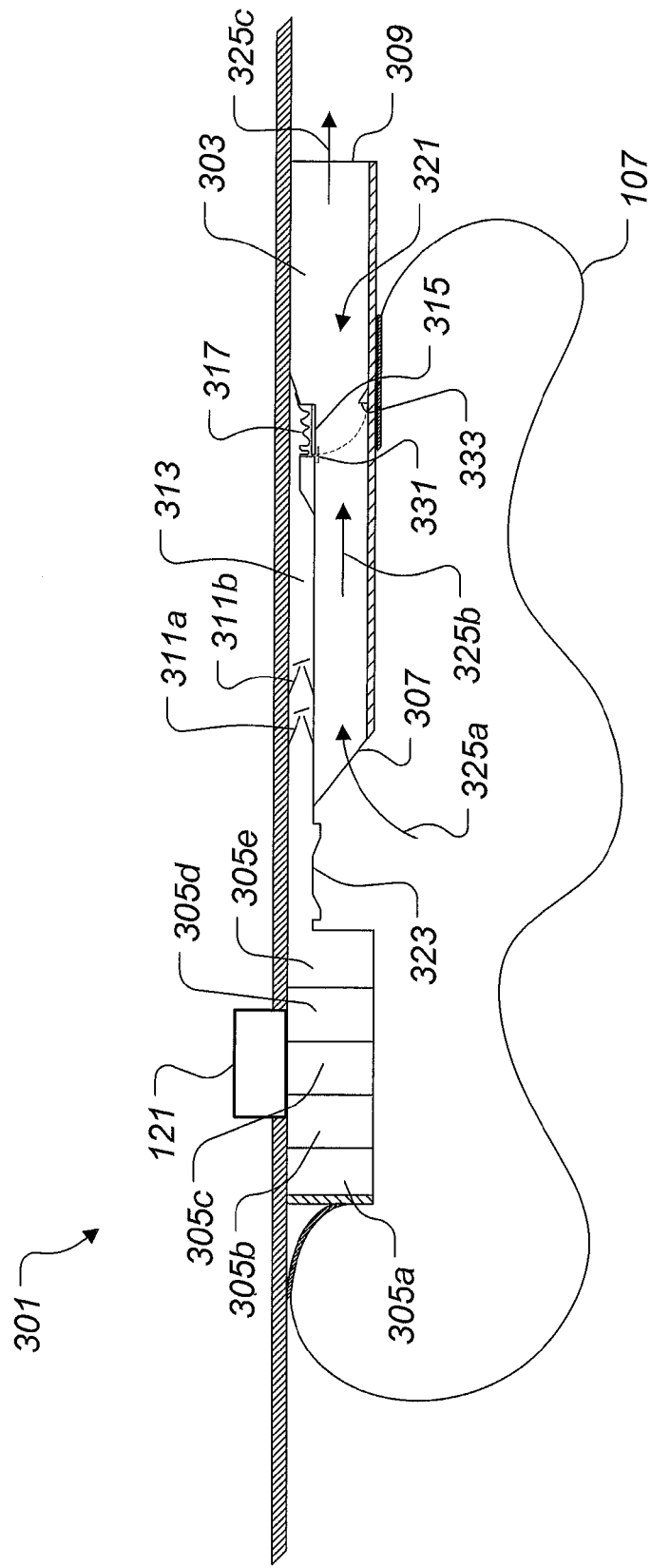
FIG. 4 is a partially sectioned side view of the vent and re-inflation system shown in FIG. 3.
Figure 5:
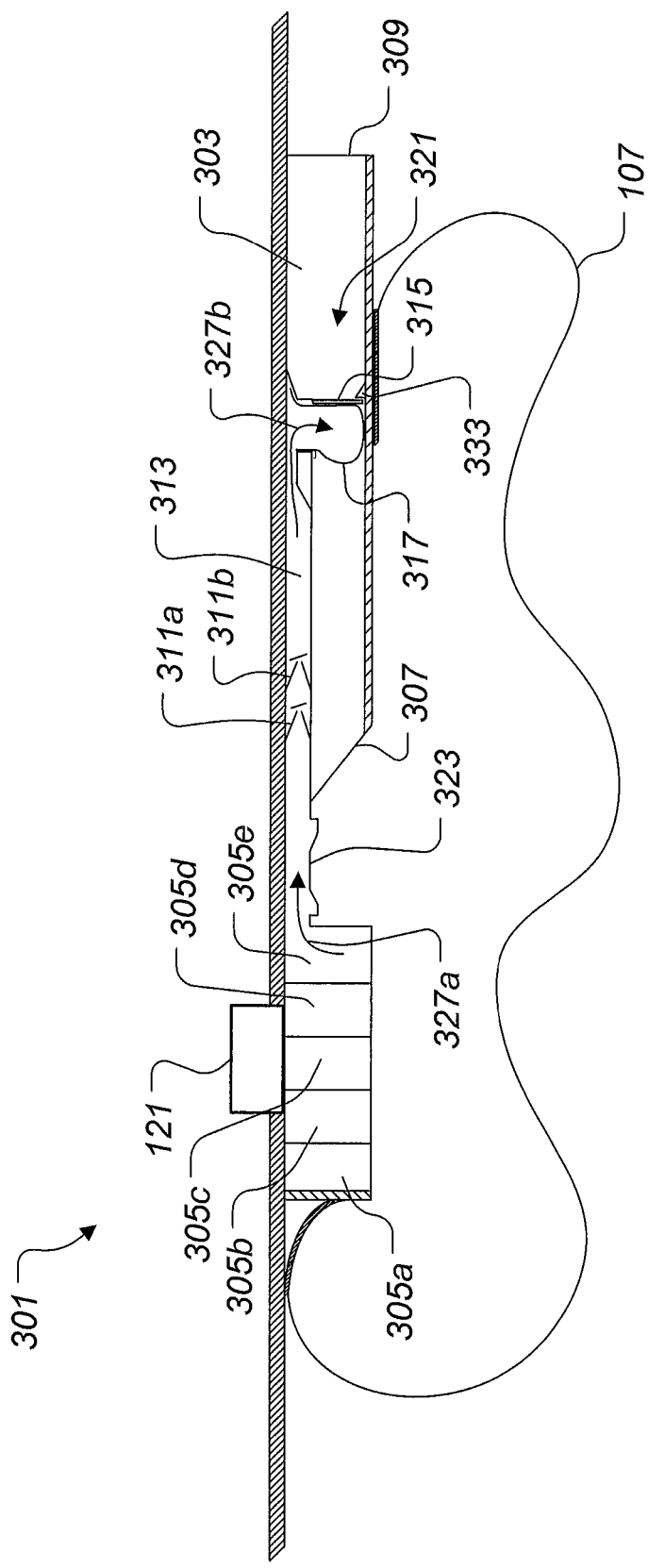
FIG. 5 is a partially sectioned side view of the vent and re-inflation system shown in FIG. 3.
Figure 6:
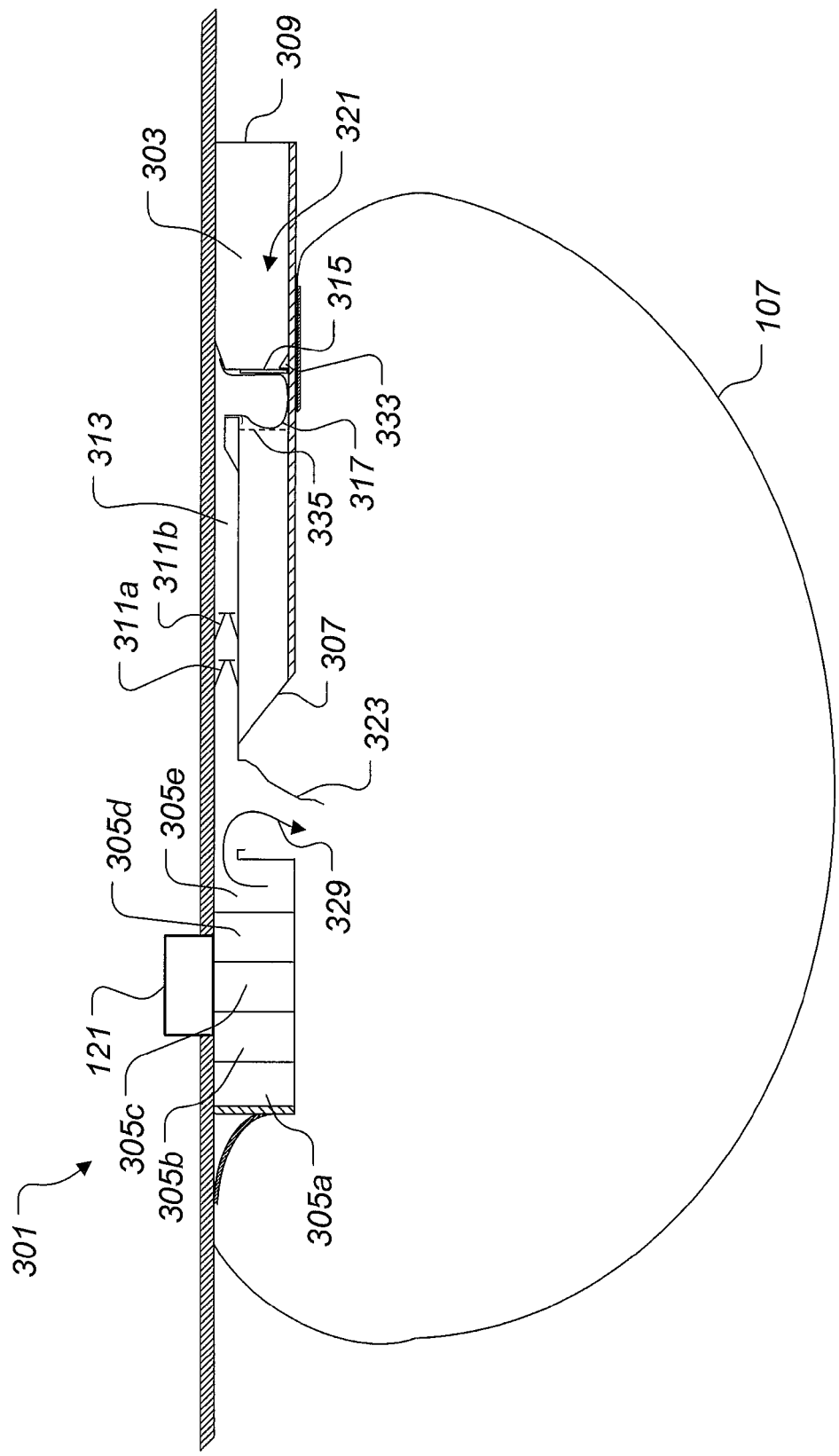
FIG. 6 is a partially sectioned side view of the vent and re-inflation system shown in FIG. 3.

FIGS. 4-6 show stylized side views of vent and re-inflation system 301 at different stages of operation. System 301 includes a plurality of gas generators 305a-305e. Vent passage 303 extends between a first opening 307 and a second opening 309. First opening 307 facilitates fluid communication between an interior of airbag 107 and vent passage 303. Similarly, second opening 309 facilitates fluid communication between vent passage 303 and an exterior environment. Vent passage 303 may include one or more flow valves to selectively change the flow rate of gas venting through vent passage 303.

The gas generators 305a-305e may be of wide variety of configurations and various types, such as gas-generating chemical devices, combustive systems, and compressed air, to name a few, for providing gas for inflation of airbags 107 and 109. For example, gas generators 305a-305e may be individual gas generators, such that each gas generator is independently operable to selectively provide pressurized gas to the interior of airbag 107 or actuator duct 313. Further, gas generators 305a-305e may be a plurality of ports, each port being connected to a singular gas generator that is configured to selectively operate and direct pressurized gas to one or more ports.

FIG. 4 illustrates system 301 in a deflating mode, such that gas is leaving airbag 107 through vent passage 303, as indicated by arrows 325a-325c. Deflating mode occurs to provide controlled energy attenuation during an impact, as well as prevent a secondary impact. Prior to the deflating of airbag 107 during impact, airbag 107 was fully inflated by gas generators 305a-305d. Preferably, at least one gas generator, such as gas generator 305e, is reserved for re-inflation of airbag 107, as discussed further herein.

Re-inflation of airbag 107 is particularly advantageous when rotorcraft 101 has an impact on a fluid surface, such as a lake, river, ocean, and the like. Re-inflation of airbag 107 allows airbag 107 to serve as a flotation device, in addition to initially providing crash attenuation. By configuring airbag 107 to serve dual purposes of crash attenuation and subsequent flotation, system 301 is more efficient and lightweight than having two separate and distinct crash attenuation and flotation systems.

FIG. 5 illustrates system 301 in a vent closing mode, which occurs after airbag 107 has been vented during impact (as shown in FIG. 4). System 301 includes a pneumatic actuator assembly 321. Pneumatic actuator assembly 321 includes an actuator duct 313, an actuator airbag 317, and an actuator door 315. In the preferred embodiment, sensor system 123 determines that rotorcraft 101 has made impact with on a liquid surface. Gas controller 121 then receives a, signal instructing the gas controller 121 to expend gas generator 305e in order to close vent passage 303 and re-inflate airbag 107. Gas generator 305e sends high pressure gas through the actuator duct 313 and into actuator airbag 317. High pressure gas from gas generator 305e forces actuator airbag 317 to expand, thereby closing actuator door 315. The closing of actuator door 315, with actuator airbag 317, results in a seal so that gas can no longer evacuate (or enter) through vent passage 303. Actuator airbag 317 is preferably of a resilient non-porous material, similar to that of airbag 107. When actuator airbag 317 fills with gas from gas generator 305e, actuator airbag 317 applies positive forces against actuator door 315. In an alternative embodiment, a porous grate 335 (shown in FIG. 6), or screen, may be located upstream in vent passage 303 in order to keep actuator airbag 317 from bulging away from actuator door.

Actuator door 315 is preferably hinged so that it rotates about the hinge during deployment. Prior to deployment, actuator door 315 is held open by a shear pin 331. Shear pin 331 is configured to shear off when actuator airbag 317 builds with pressure, thereby releasing actuator door 315. It should be appreciate that actuator door 315 may take on a wide variety of configurations.

Referring now to FIG. 6, after actuator airbag 317 is fully deployed, thus resulting in the closing of actuator door 315, back pressure builds from the continued expelling of gas from gas generator 305e. The resulting pressure causes a blow-away door 323 to open, thereby allowing the gas generator 305e to re-inflate airbag 107. Direction arrow 329 indicates the path of gas from gas generator 305e into airbag 107. At this stage, airbag 107 is acting as a flotation airbag. As the blow-away door 323 opens, it is preferred that one-way valves 311a and 311b operate to prevent the deflation of actuator airbag 317 via actuator duct 313. In an alternative embodiment, a latch, or similar device, is used to prevent actuator door 315 from releasing from the closed position, in lieu of one-way valves 311a and 311b. Blow-away door 323 may be any pressure relief valve capable of diverting gas into airbag 107 after a predetermined pressure has been reached.

Actuator door 315 preferably sits against a stop 333, or frame that facilitates sealing contact between actuator door 315 and the interior of vent passage 303. Furthermore, a compliant seal may be used between stop 333 and actuator door 315 to facilitate sealing contact therebetween.

With airbag 107 re-inflated, airbag 107 functions to supplement flotation of rotorcraft 101. It should be appreciated that other flotation bags may be used to augment the flotation provided by airbag 107. For example, one or more outrigger flotation airbags may be deployed at the outboard portions of the rotorcraft 101 in order to contribute to flotation and stability.

Aircrafts that utilize crash attenuation system locate the crash attenuation airbags directly under the fuselage. After the aircraft has crashed with the airbags located under the fuselage instability can occur because of the high center of gravity. For aircrafts that crash in the water, typically the aircraft flips over from the instability. A new and improved crash attenuation system is required that increases the stability of aircrafts after impacts into water and provides a stable platform for the aircraft to float on.

Figure 7B:
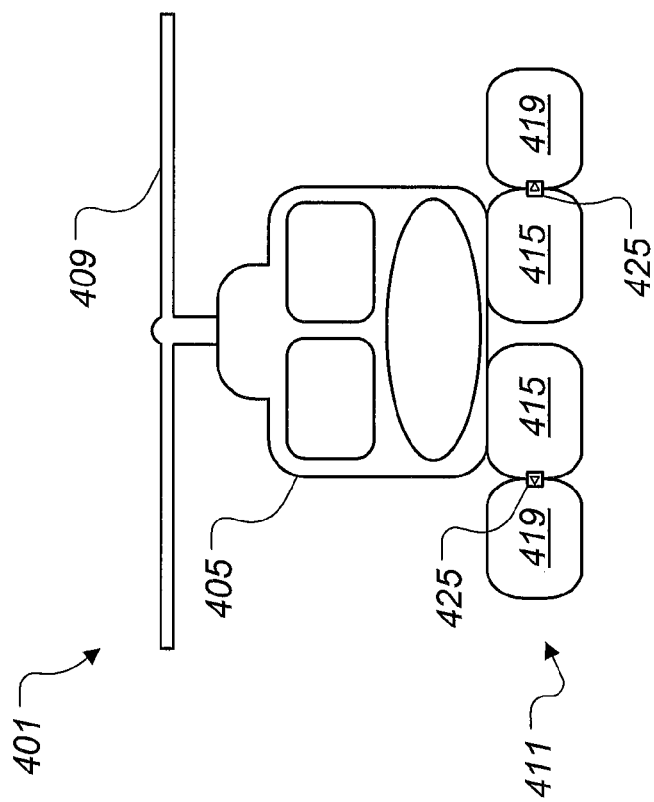
FIG. 7b is a perspective view of a re-inflation for flotation system after an impact, according to the present application.
Figure 7A:
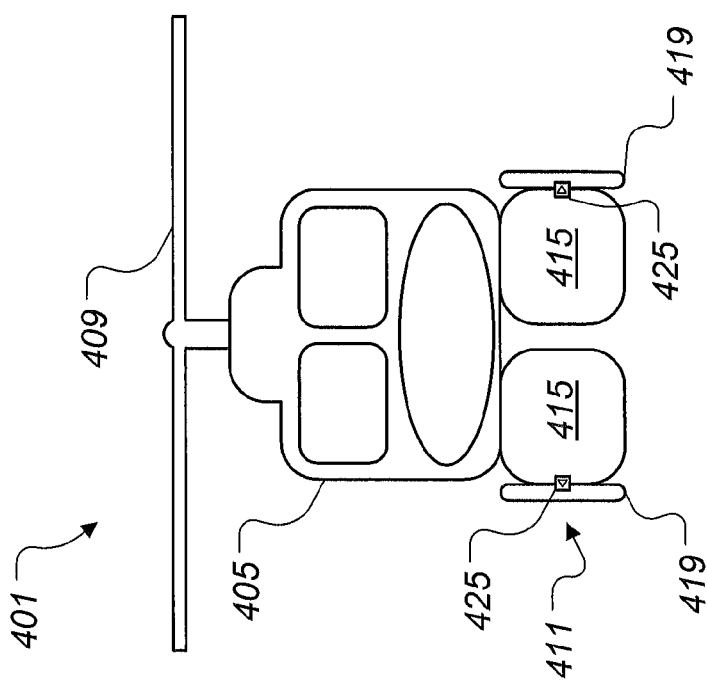
FIG. 7a is a perspective view of a re-inflation for flotation system before an impact, according to the present application.

Referring now also to FIGS. 7a and 7b, stylized views of an improved crash attenuation system featuring reinflation for floatation. System 401 includes a rotorcraft 405 having a rotor system 409, for ease of view the landing gear of rotorcraft 405 are not shown, and a flotation system 411. Flotation system uses inner airbags 415 coupled to and in fluid communication with outer airbags 419 through vent systems 425. Preferable vent systems 425 includes one way valves configured such that the air that is expelled from the inner airbags 415 due to a crash is ported to the outer airbags 419 to inflate the outer airbags 419. Alternatively vent systems 425 includes vent passages that do not restrict the direction of airflow between the inner and outer airbags. FIG. 7a as shown illustrates the system 401 before a crash. Inner airbags 415 are fully inflated and the outer airbags 419 are not fully inflated.

FIG. 7b as shown illustrates the system 401 after a crash. Inner airbags 415 are partially inflated and the outer airbags 419 are fully inflated. Because the outer airbags 419 are inflated, the stability of rotorcraft 405 is increased because the weight distribution is spread out past the sides of the fuselage.

Referring now also to FIGS. 8a and 8b, stylized views of an improved crash attenuation system featuring reinflation for floatation. System 501 includes a rotorcraft 505 having a rotor system 509, for ease of view the landing gear of rotorcraft 505 are not shown, and a flotation system 511. Floatation system uses inner airbags 515 coupled to outer airbags 519 through vent system 525. Outer airbags 519 are stored interior to in the inner airbags 515. Preferable vent system 525 includes one way valves configured such that the air that is expelled from the inner airbags 515 due to a crash is ported to the outer airbags 519 and they pop out of the inner airbags 515. Alternatively vent system 525 includes actuator door, such as actuator door 315. FIG. 8a as shown illustrates the system 501 before a crash. Inner airbags 515 are fully inflated and the outer airbags 519 are not fully inflated.

FIG. 8b as shown illustrates the system 501 after a crash. Inner airbags 515 are partially inflated and the outer airbags 519 are fully inflated. Because the outer airbags 519 are inflated, the stability of rotorcraft 505 is increased because the weight distribution is spread out past the sides of the fuselage.

Referring now also to FIGS. 9a, 9b, 9c, and 9d, stylized views of an improved crash attenuation system featuring reinflation for floatation. System 601 includes a rotorcraft 605 having a rotor system 609, for ease of view the landing gear of rotorcraft 605 is not shown, and a flotation system 611. Floatation system uses inner airbags 615 coupled to outer airbags 619 through vent system 625. Outer airbags 619 are stored interior to in the inner airbags 615. Air that is expelled from the inner airbags 615 due to a crash is ported to the outer airbags 619 and they pop out of the inner airbags 615. FIG. 9a as shown illustrates the system 601 before a crash. Inner airbags 615 are fully inflated and the outer airbags 619 are not fully inflated.

FIG. 9b as shown illustrates the system 601 after a crash. Inner airbags 615 are partially inflated and the outer airbags 619 are fully inflated. Because the outer airbags 619 are inflated, the stability of rotorcraft 605 is increased because the weight distribution is spread out past the sides of the fuselage. FIG. 9c is an enlarged view of a portion of FIG. 9a. FIG. 9d is an enlarged view of a portion of FIG. 9b. It should be apparent that the edges of outer airbag 619 are sealed to the inner airbag 615. A pressure differential between a volume of air inside the inner airbags 615 and outside the inner airbags causes the outer airbags 619 to be pushed outside of the inner airbags 615 during a crash and/or impact.

Referring now also to FIGS. 10a and 10b, stylized views of an improved crash attenuation system featuring reinflation for floatation. System 701 includes a rotorcraft 705 having a rotor system 709, for ease of view the landing gear of rotorcraft 705 are not shown, and a flotation system 711. Floatation system uses inner airbags 715 pneumatically coupled to outer airbags 719 through vent systems 725. Outer airbags 719 are stored interior to in the inner airbags 715. Preferable vent systems 725 are one way valves configured such that the air that is expelled from the inner airbags 715 due to a crash is ported to the outer airbags 719 and they pop out of the inner airbags 715. As shown vent systems 725 are passive, however it should be apparent that the vent systems can be selectively controlled. For example, the pilot realizes that the crash is going to occur over water and selects a switch so that the air is vented to the outer airbags. Or the flight control computer senses water during impact and activates the vent systems 725 to increase stability. Vent systems 725 are located in partitions 727 inside the inner airbags 715. Partitions 727 create a first volume of air 729 and a second volume of air 731 inside the inner airbags 715. During a crash air from the first volume 729 escapes through valve 725 into second volume 731 thereby expelling outer airbags 719 though opening 735. FIG. 10a as shown illustrates the system 701 before a crash. Inner airbags 715 are fully inflated and the outer airbags 719 are not fully inflated.

FIG. 10b as shown illustrates the system 701 after a crash. Inner airbags 715 are partially inflated and the outer airbags 719 are fully inflated. Because the outer airbags 719 are inflated, the stability of rotorcraft 705 is increased because the weight distribution is spread out past the sides of the fuselage.

The system of the present application provides significant advantages, including: (1) allowing the crash attenuation airbag to function as a flotation airbag subsequent an impact; (2) providing an actuator system that is actuated by the gas generator system that is used to initially inflate the crash attenuation airbag; and (3) allowing the gas generator system to function as to close the actuator door, in addition to inflating and re-inflating the airbag.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A crash attenuation system for an aircraft, the system comprising:
    a first airbag inflatable generally adjacent to an exterior of the aircraft;
    a second airbag inflatable generally adjacent to an exterior of the first airbag; and
    a vent system, the vent system comprising:
        a vent passage being configured to allow gas to escape from within the first airbag during an impact into the second airbag;
    wherein the first airbag is inflated and the second airbag is uninflated before impact.

2. The crash attenuation system for an aircraft according to claim 1, the vent system further comprising:
    a valve located in the vent passage;
    wherein the valve is a one-way valve.

3. The crash attenuation system for an aircraft according to claim 2, wherein the second airbag is fully inflated after the impact; and
    wherein the first airbag is partially inflated after the impact.

4. The crash attenuation system for an aircraft according to claim 1, the vent system further comprising:
    a partition located inside the first airbag; and
    a one-way valve located in the partition.

5. The crash attenuation system for an aircraft according to claim 4, wherein the partition forms a first volume and a second volume inside the first airbag; and
    wherein during impact the gas of the first volume is expelled into the second volume thereby expanding the second airbag.

6. The crash attenuation system for an aircraft according to claim 4, wherein the one-way valve is selectively controlled.

7. The crash attenuation system for an aircraft, comprising:
    a inner airbag inflatable generally adjacent to an exterior of the aircraft;
    an outer airbag inflatable generally adjacent to an interior of the first airbag; and
    a vent system, the vent system comprising:
        a vent passage being configured to allow gas to escape from within the inner airbag during an impact into the outer airbag;
        wherein the inner airbag is inflated and the outer airbag is uninflated before impact.

8. The crash attenuation system for an aircraft according to claim 7, the vent system further comprises:
    a one-way valve.

9. The crash attenuation system for an aircraft according to claim 7, wherein the outer airbag is fully inflated after the impact; and
    wherein the inner airbag is partially inflated after the impact.

10. The crash attenuation system for an aircraft according to claim 7, wherein the outer airbag is stored inside the inner airbag until impact.

11. The crash attenuation system for an aircraft according to claim 7, further comprising:
    a partition located inside the inner airbag;
    wherein the one-way valve is located in the partition.

12. The crash attenuation system for an aircraft according to claim 11, wherein the partition forms a first volume and a second volume; and
    wherein during impact the gas of the first volume is expelled into the second volume thereby expanding the outer airbag.

13. The crash attenuation system for an aircraft according to claim 7, wherein a pressure differential between the inner airbag and the outer airbag causes the outer airbag to be expelled from the vent passage.

14. The crash attenuation system for an aircraft according to claim 8, wherein the one-way valve is selectively controlled.

15. The crash attenuation system for an aircraft according to claim 7, wherein all edges of the outer airbag are sealed to the inner airbag.

16. The crash attenuation system for an aircraft according to claim 12, wherein the outer airbag is stored inside the inner airbag between the partition and the vent passage until impact.

17. The crash attenuation system for an aircraft, comprising:
- an inner set of airbags inflatable generally adjacent to a position beneath an exterior of the aircraft;
- an outer set of airbags inflatable generally adjacent the inner set airbags; and
- a vent system, the vent system comprising:
  - a vent passage being configured to allow gas to escape from within the inner airbags during an impact into the outer airbags;
- wherein the inner set of airbags are inflated and the outer set of airbags are uninflated before impact.

* * * * *